Patented Aug. 30, 1938

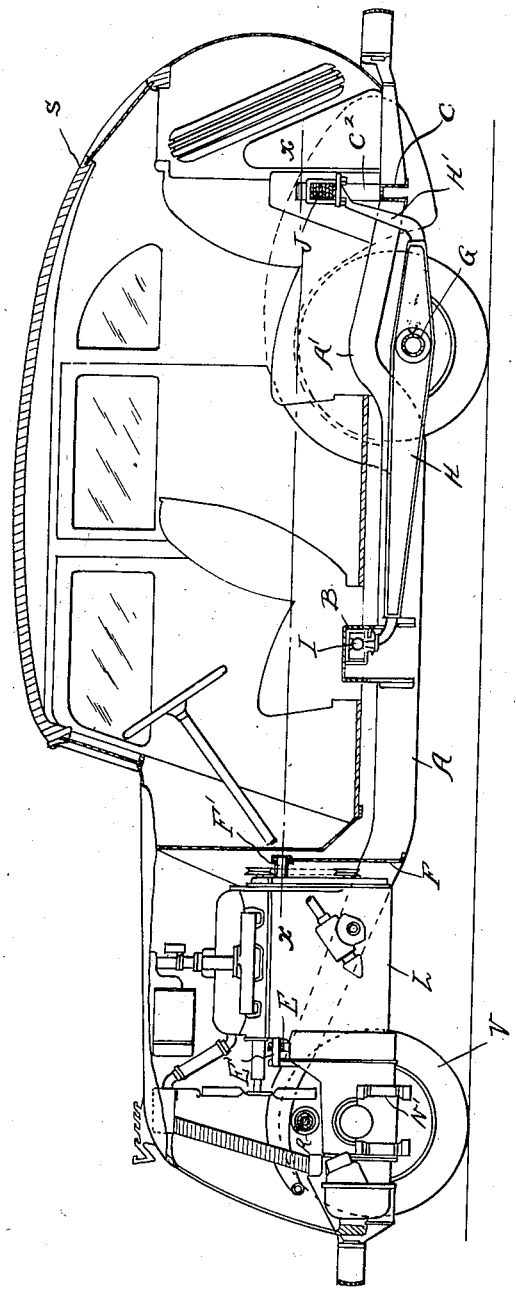

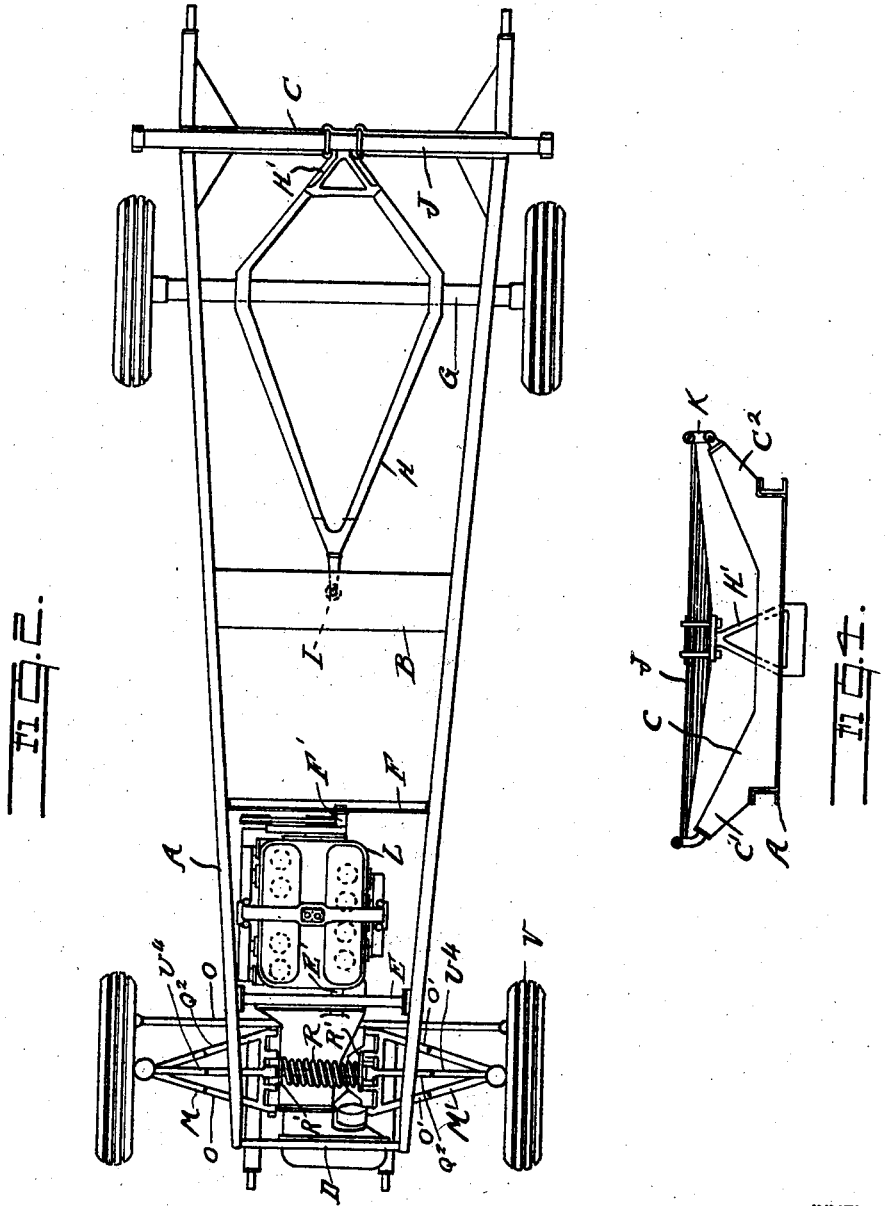

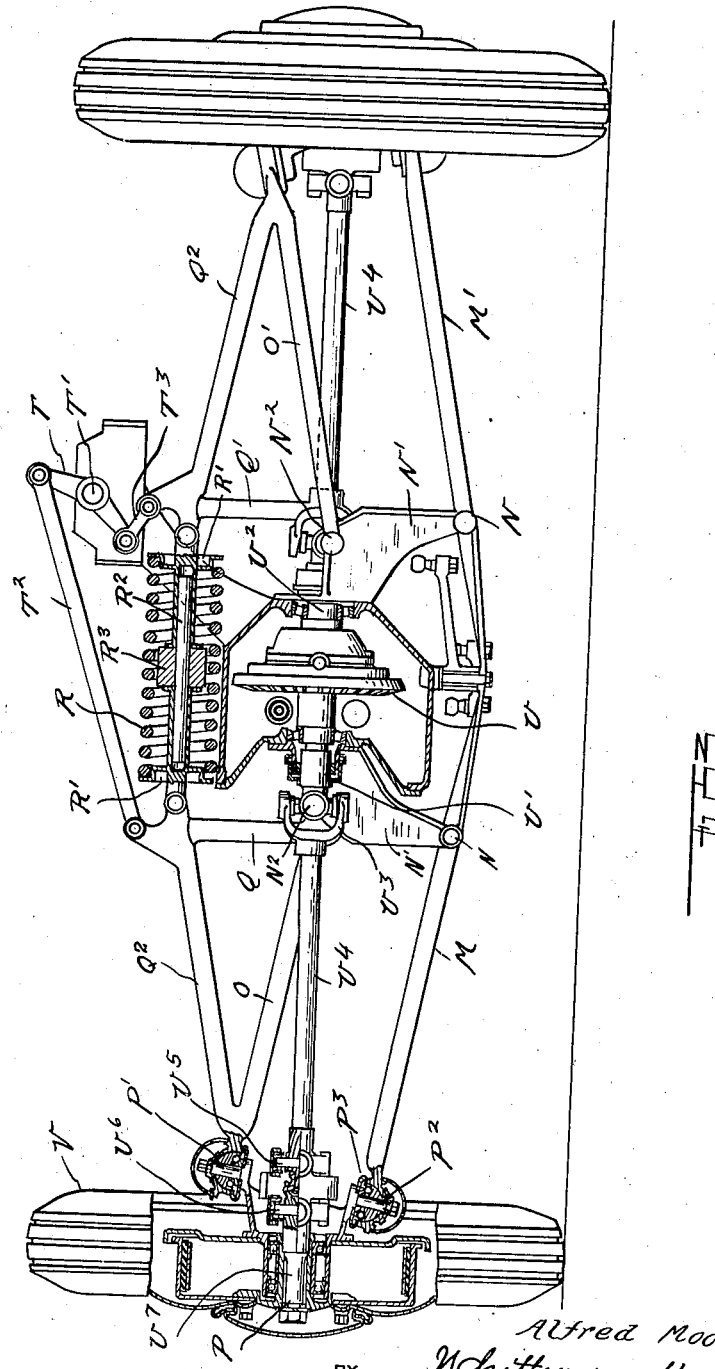

2,128,660

UNITED STATES PATENT OFFICE 2,128,660

MOTOR VEHICLE

Alfred Moorhouse, Detroit, Mich.

Application November 15, 1933, Serial No. 698,202

3 Claims. (Cl. 180—1)

The invention relates to motor vehicles and more particularly to that type known as front axle drive. It is the object of the invention to obtain various advantages among which are First, greater lateral stability;
Second, easy riding qualities;
Third, elimination of torsional stresses in the chassis frame and body, and
Fourth, the checking of periodic oscillations such for instance as that known as "shimmy".

With these and various other specific advantages in view, the invention consists in the construction as hereinafter set forth.

In the drawings:

Fig. 1 is a diagrammatic side elevation of my improved vehicle;

Fig. 2 is a plan view of the chassis with the body removed;

Fig. 3 is a sectional elevation in the transverse plane of the forward driving axle;

Fig. 4 is a rear elevation showing the rear spring suspension.

With spring suspensions of the usual type employed on motor vehicles, the center of gravity of the sprung weight lies above the supporting springs. Consequently where there is a change in direction of travel, the yielding of the springs will permit a lateral shifting of the sprung weight with a tendency to overturn the vehicle. It is therefore one of the specific objects of the present invention to obtain a construction in which the sprung mass is held from any lateral shifting. It is a further object to provide an unyielding lateral thrust connection between the sprung frame and the supporting running gear which is located substantially in line with the center of gravity of the sprung mass, thereby balancing the inertial forces above and below and avoiding any tendency towards rotation. Still further it is an object to obtain a spring suspension in which the springs respond only to vertical oscillations and are uninfluenced by either positive or negative acceleration of the vehicle. This permits of using lighter springs which are more sensitive to vertical oscillations, and which therefore produce better riding qualities.

Motor vehicle bodies as usually mounted on the frame are subjected to torsional stresses necessitating a strength of construction which would not otherwise be needed. I have avoided such torsional stresses by a three-point support of the body carrying frame upon the running gear. Finally, the motor instead of being rigid with the chassis frame which supports the body, is independently carried on the driving axle having only a pivotal connection with said frame. I have also designed a peculiar construction of resiliently yieldable axle frame on which the motor is directly mounted.

In detail, A are the side sills of the chassis frame which are connected by a central cross member B, a rear cross member C and forward cross members D, E and F. G is the rear axle which is connected to an independent frame H. The forward end of this frame has a universal pivotal connection I at the center of the cross member B and the rear end has an upward extension H' which is centrally connected to a cross spring J. The latter is in the form of a substantially straight leaf spring, the opposite ends of which are pivotally connected to upward extension C' and C² of the cross member C, with a link K at one end to compensate for lateral deflection. The axle G at the point of connection to the frame H is bent downward below the axis of the wheels and the side sills A are bent upward at A' to pass over and provide clearance above said axle.

L is the power unit including the motor, transmission and front axle drive. This unit instead of being directly mounted on the chassis frame is resiliently supported on a front axle frame of the following construction. M and M' are triangular frames, the base portions of which are pivotally connected at N to arms N' on the housing of the power unit. O and O' are similar triangular frames arranged above and parallel to frames M and M' and similarly pivotally connected at N² to the arms N'. The outer ends of each pair of these parallel frames are universally pivotally connected to a steering axle P for a front driving wheel. The frames O and O' are further provided with upwardly extending bell crank arms Q and Q' with an inclined brace member Q² between which is arranged a compression spring R. Thus the load of the power unit is resiliently carried by this spring R, the reaction of which is to oppose downward movement of the inner ends of the parallelogram frames. As specifically shown, the opposite ends of the spring R engage sleeve abutments R' pivotally connected to the frames O and O' and independently slidable on a rod R² which also carries a buffer block R³ between the inner end of said sleeves. However, the power unit L is also connected with the chassis frame by aligned pivots E' and F' on the cross members E and F respectively in front and in rear of the engine portion of the unit. The arrangement is such that the chassis frame has in effect a three-point suspension, one point being formed by the aligned pivots E', F', and the other two points at the ends of the spring J. Also, these points are at such an elevation as to be substantially in the horizontal plane of the center of gravity of the chassis frame and load supported thereon indicated by the line $x$—$x$, Figure 1.

With the construction as thus far described, it will be understood that the body S can be directly mounted upon the sills A but that neither the body nor the chassis frame will be subjected to any torsional stresses, due to unevenness in the road bed or from any other cause. At the same time the power unit has a spring support on the wheels, the pivots N and $N^2$ permitting relative oscillation of said unit and the parallelogram frames M, M', O, O'. To avoid any lack of stability, these parallelogram frames are cross connected so that the oscillation of the frames on one side compels a similar movement of the frames on the opposite side. This is accomplished by a lever T pivoted at T' to any convenient point on the housing of the power unit, one end of said lever being pivotally connected by the link $T^2$ with the bell crank arm Q and the other end being pivotally connected by the link $T^3$ with the bell crank arm Q'.

The power transmission between the engine and the driving wheels is not illustrated in detail, as this forms no part of the present invention. However, as shown, power is communicated through a gear U and associated differential gearing to shafts U' and $U^2$ connected by universal joints $U^3$ with shafts $U^4$ extending to the opposite wheels. The shafts $U^4$ in turn are connected by universals $U^5$ and $U^6$ with a stub shaft $U^7$ having a driving connection with the wheel V. To provide space for this driving connection the steering axle P is bifurcated to embrace the shafts and universals and king pins P', $P^2$ are secured to the furcations thereof. The frames M, M', O, O' are then connected to the king pins by universal joints $P^3$ which permit both the oscillation of said frames on said king pins and the turning of the steering axle about the axis of said pin. One important advantage of mounting the power unit on the axle is that the increase in mass slows the period of oscillation thereof. This checks any tendency towards shimmy or other periodic oscillations incident to running at high speed.

What I claim as my invention is:

1. In a motor vehicle, the combination with a pair of wheeled axles, of a power unit having a spring support on one of said axles and a driving connection with the wheels thereof, a frame pivotally connected to said power unit for relative rotation about a longitudinal axis and a transversely extending leaf spring forming a connection between said frame and the other axle, said spring and pivotal connection being arranged substantially in line with the center of gravity of the mass supported by the frame and said spring being substantially straight under normal load and forming an unyielding lateral thrust connection between said frame and axle.

2. In a motor vehicle, a power unit, a driving axle having oppositely extending parallelogram frames pivotally connected at their inner ends to said power unit, wheels supporting the outer ends of said frames, a flexible driving connection between said power unit and wheels, bell crank levers respectively rigid with one member of each of said oppositely extending parallelogram frames and a compression spring between said bell crank levers for yieldably supporting the load of said power unit.

3. In a motor vehicle, a power unit, a pair of oppositely extending parallelogram frames pivotally connected at their inner ends to said power unit, wheel engaging stub axles pivotally connected at the outer ends of each of said oppositely extending parallelogram frames, wheels for supporting said axles, a flexible driving connection between said power unit and said axles, bell crank arms extending from one member of each of said oppositely extending parallelogram frames, a compression spring between said bell crank arms and an equalizer cross connecting said oppositely extending parallelogram frames to compel equal movement thereof with respect to said power unit.

ALFRED MOORHOUSE.